US009229529B2

(12) United States Patent
Aizawa

(10) Patent No.: US 9,229,529 B2
(45) Date of Patent: Jan. 5, 2016

(54) APPARATUS AND CONTROL METHOD BASED ON MOTION

(71) Applicant: Sony Corporation, Minato-ku (JP)

(72) Inventor: Takahiro Aizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 89 days.

(21) Appl. No.: 14/134,494

(22) Filed: Dec. 19, 2013

(65) Prior Publication Data
US 2015/0177826 A1 Jun. 25, 2015

(51) Int. Cl.
G06F 3/01 (2006.01)
G06F 3/041 (2006.01)

(52) U.S. Cl.
CPC .......... G06F 3/01 (2013.01); G06F 3/016 (2013.01); G06F 3/041 (2013.01)

(58) Field of Classification Search
CPC .............................. G06F 3/017; G06F 3/0418
See application file for complete search history.

(56) References Cited

U.S. PATENT DOCUMENTS

| 2009/0015559 | A1* | 1/2009 | Day et al. ............ 345/167 |
| 2010/0194682 | A1* | 8/2010 | Orr et al. ............ 345/156 |
| 2012/0127115 | A1* | 5/2012 | Gannon ............... 345/174 |
| 2013/0265225 | A1* | 10/2013 | Nasiri et al. ......... 345/156 |

FOREIGN PATENT DOCUMENTS

JP 2010-3307 A 1/2010

* cited by examiner

Primary Examiner — Gerald Johnson
(74) Attorney, Agent, or Firm — Oblon, McClelland, Maier & Neustadt, L.L.P

(57) ABSTRACT

A device includes a display panel configured to display an interface. The device includes a motion sensor configured to detect a motion of the device and to output a detection signal in response to the detection of the motion. The device includes circuitry configured to control, based on the detection signal, the display panel such that at least one of a display position and a display size of an element displayed in the interface changes, wherein when the motion includes a physical shock on the device, the detection signal includes an indication of a hitting position corresponding to a position on the device where the physical shock is detected by the motion sensor, and the circuitry controls the display panel such that the at least one of the display position and the display size of the element changes based on the hitting position.

20 Claims, 14 Drawing Sheets

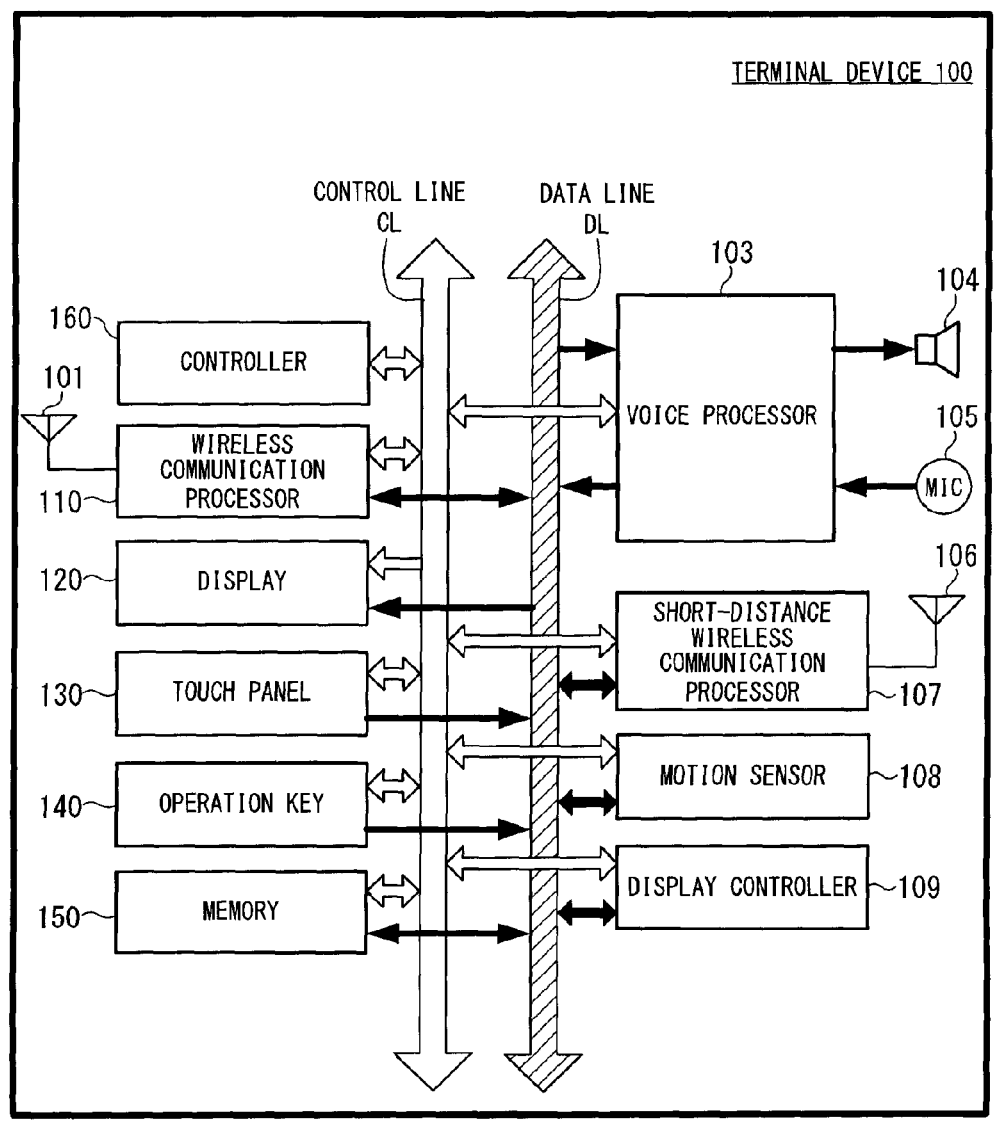

APPARATUS AND CONTROL METHOD BASED ON MOTION

BACKGROUND

1. Technical Field

The present disclosure relates to detecting aspects of controlling a terminal device based on features of a detected motion of the terminal device

2. Description of Related Art

Terminal devices such as smartphones and tablet devices may include a touch panel screen such that a user may perform touch operations on a displayed interface. For example, the user may touch the operating surface of the touch panel screen with his/her finger to perform an input operation.

In recent years, in an effort to provide more information to the user, display screens in terminal devices have grown larger in size. However, the increasing screen size causes difficulty when a user wishes to perform a touch operation using a single hand (i.e., the hand holding the terminal device). In particular, a touch operation using a finger on a single hand that is holding the terminal device becomes difficult because the user's fingers cannot reach all areas of the touch panel display surface. For example, a user holding a bottom right corner of the terminal device cannot reach the upper left corner of the device in order to perform a touch operation. As a result, users are precluded from performing single-handed touch operations on terminal devices with large touch panel display screens, thereby requiring the user to operate the touch panel device using both hands and/or requiring the user to place the terminal device on a resting surface such as a table while performing the touch operation.

SUMMARY

According to certain embodiments, a device includes a display panel configured to display an interface. The device includes a motion sensor configured to detect a motion of the device and to output a detection signal in response to the detection of the motion. The device includes circuitry configured to control, based on the detection signal, the display panel such that at least one of a display position and a display size of an element displayed in the interface changes, wherein when the motion includes a physical shock on the device, the detection signal includes an indication of a hitting position corresponding to a position on the device where the physical shock is detected by the motion sensor, and the circuitry controls the display panel such that the at least one of the display position and the display size of the element changes based on the hitting position.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 illustrates a non-limiting example of a block diagram of a terminal device, according to one embodiment;

DETAILED DESCRIPTION

Figure 2A:
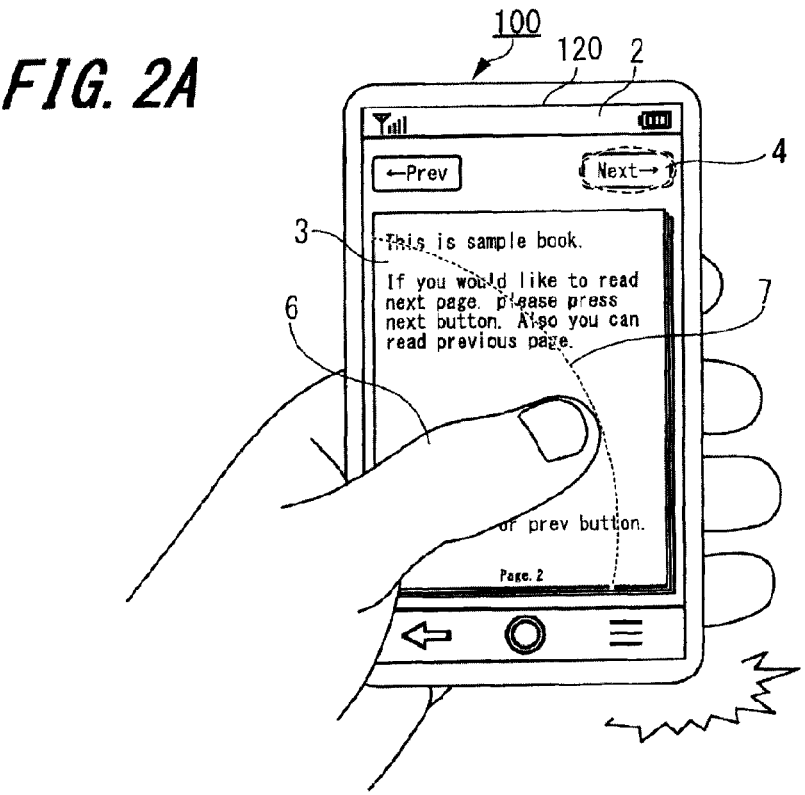
FIGS. 2A and 2B illustrate non-limiting exemplary features of motion-based interface control, according to one embodiment.

Referring now to the drawings, wherein like reference numerals designate identical or corresponding parts throughout the several views.

FIG. 1 illustrates a block diagram for an exemplary terminal device according to certain embodiments of the present disclosure. In certain embodiments, terminal device 100 may be a smartphone. However, the skilled artisan will appreciate that the features described herein may be adapted to be implemented on other devices (e.g., a desktop computer, a laptop, a tablet, a server, an e-reader, a camera, a navigation device, etc.).

Referring now to FIG. 1, the exemplary terminal device 100 of FIG. 1 includes a controller 160, a wireless communication processor 110 connected to an antenna 101, a speaker 104, a microphone 105, and a voice processor 103.

The controller 160 may include one or more Central Processing Units (CPUs), and may control each element in the terminal device 120 to perform features related to communication control, audio signal processing, control for the audio signal processing, still and moving image processing and control, and other kinds signal processing. The controller 160 may perform these features by executing instructions stored in a memory 150. Alternatively or in addition to the local storage of the memory 150, the features may be executed using instructions stored on an external device accessed on a network, or on a non-transitory computer readable medium.

The memory 150 may include, e.g., Read Only Memory (ROM), Random Access Memory (RAM), or a memory array including a combination of volatile and non-volatile memory units. The memory 150 may be utilized as working memory by the controller 160 while executing the processing and algorithms of the present disclosure. Additionally, the memory 150 may be used for long-term storage, e.g., of image data and information related thereto.

The terminal device 100 includes a control line CL and data line DL as internal communication bus lines. Control data to/from the controller 160 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication.

The wireless communication processor 110 controls the communication performed between the terminal device 100 and other external devices via the antenna 101. For example, the wireless communication processor 110 may control communication between base stations for cellular phone communication.

The speaker 104 emits an audio signal corresponding to audio data supplied from the voice processor 103.

The microphone 105 detects surrounding audio, and converts the detected audio into an audio signal. The audio signal may then be output to the voice processor 103 for further processing.

The voice processor 103 demodulates and/or decodes the audio data read from the memory 150, or audio data received by the wireless communication processor 110 and/or a short-distance wireless communication processor 107. Additionally, the voice processor 103 may decode audio signals obtained by the microphone 105.

The exemplary terminal device of FIG. 1 may also include a display 120, a touch panel 130, an operation key 140, and a short-distance communication processor 107 connected to an antenna 106.

The display 120 may be a Liquid Crystal Display (LCD), an organic electroluminescence display panel, or another display screen technology. In addition to displaying still and moving image data, the display 120 may display operational inputs, such as numbers or icons, which may be used for control of the terminal device 100. The display 120 may additionally display a graphical user interface such that a user may control aspects of the terminal device 100 and/or other devices. Further, the display 120 may display characters and images received by the terminal device 100 and/or stored in the memory 150 or accessed from an external device on a network. For example, the terminal device 100 may access a network such as the Internet, and display text and/or images transmitted from a Web server.

The touch panel 130 may include a physical touch panel display screen and a touch panel driver. The touch panel 130 may include one or more touch sensors for detecting an input operation on an operation surface of touch panel display screen. Used herein, the phrase "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch panel section 130 may detect when the stylus approaches/contacts the operation surface of the touch panel display (similar to the case in which a finger is used for the touch operation).

In certain aspects of the present disclosure, the touch panel 130 may be disposed adjacent to the display 120 (e.g., laminated), or may be formed integrally with the display 120. For simplicity, the present disclosure assumes the touch panel 130 is formed integrally with the display 120 and therefore, examples discussed herein describe touch operations being performed on the surface of the display 120 rather than the touch panel 130. However, the skilled artisan will appreciate that this is not limiting.

For simplicity, the present disclosure assumes the touch panel section 130 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel section 130 for control processing related to the touch panel section 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger, is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's fingers around an edge of the display panel 120 (e.g., gripping a protective case that surrounds the display/touch panel). Signals may be transmitted by the touch panel driver, e.g., in response to a detection of a touch operation, in response to a query from another element, based on timed data exchange, etc.

The touch panel 130 and the display 120 may be surrounded by a protective casing, which may also enclose the other elements included in the terminal device 120. In certain embodiments, a position of the user's fingers on the protective casing (but not directly on the surface of the display 120) may be detected by the touch panel 130 sensors. Accordingly, the controller 160 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 160 may be configured to detect which hand is holding the terminal device 120, based on the detected finger position. For example, the touch panel 130 sensors may detect a plurality of fingers on the left side of the terminal device 120 (e.g., on an edge of the display 120 or on the protective casing), and detect a single finger on the right side of the terminal device 120. In this exemplary scenario, the controller 160 may determine the that the user is holding the terminal device 120 with his/her right hand because the detected grip pattern corresponds to an expected pattern when the terminal device 120 is held only with the right hand.

Next, the operation key 140 may include one or more buttons or similar external control elements, which may generate an operation signal based on a detected input by the user. In addition to outputs from the touch panel 130, these operation signals may be supplied to the controller 160 for performing related processing and control. In certain aspects of the present disclosure, the processing and/or functions associated with external buttons and the like may be performed by the controller 160 in response to an input operation on the touch panel display screen rather than the external button, key, etc. In this way, external buttons on the terminal device 100 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The terminal device 100 may include a motion sensor 108. The motion sensor 108 may detect features of motion (i.e., one or more movements) of the terminal device 100. For example, the motion sensor 108 may include an accelerometer, a gyroscope, a geomagnetic sensor, a geolocation sensor, etc., or a combination thereof, to detect motion of the terminal device 100. In certain embodiments, the motion sensor 108 may generate a detection signal that includes data representing the detected motion. For example, the motion sensor may determine a number of distinct movements in a motion (e.g., from start of the series of movements to the stop, within a predetermined time interval, etc.), a number of physical shocks on the terminal device 100 (e.g., a jarring, hitting, etc., of the terminal device), a speed and/or acceleration of the motion (instantaneous and/or temporal), or other motion features. The detected motion features may be included in the generated detection signal. The detection signal may be transmitted, e.g., to the controller 160, whereby further processing may be performed based on data included in the detection signal.

In certain embodiments, the terminal device 100 includes a display controller 109. The display controller 109 may communicate with the controller 160 to perform control processing of the display 120. For example, the controller 160 may receive the detection signal generated by the motion sensor 108. In response to receiving the detection signal, the controller 160 may output a control signal to the display controller 109, wherein the control signal includes instructions for controlling a displayed interface. For example, the display control may, in certain embodiments, control a display area corresponding to an element included in the interface, based on the control signal received from the controller 160. In certain embodiments, the display area is controlled by altering one or more of a display position and a display size of the element in the interface. In certain embodiments, the controller 160 may control the display 120 directly (i.e., without the display controller 109). Further aspects of display control will be discussed in detail throughout the present disclosure.

Figure 2B:
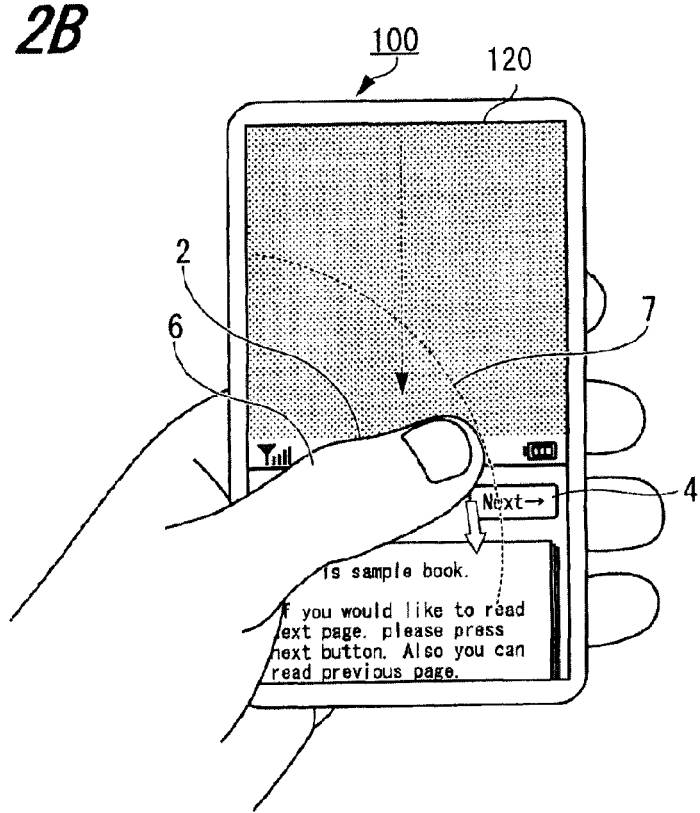

Next, FIGS. 2A and 2B illustrate non-limiting exemplary features of motion based interface control, according to certain embodiments.

Referring first to FIG. 2A, FIG. 2A illustrates the terminal device 100 held with a single hand. The terminal device 100 includes the display 120, which is displaying an interface 2. The interface 2 includes a message body 3 and a button 4, which is a display element, for example, that advances the interface 2 to a following page.

As shown in the figure, the terminal device 100 is held with the user's left hand. Generally, when holding a terminal device such as a smartphone with a single hand, the user supports the underside of the terminal device with their fingers and/or palm while performing touch operations with the user's thumb. In the example shown in FIG. 2A, the user's thumb 6 is used to perform touch operations on the operating surface of the display 120. Because the user is holding and operating the terminal device 100 with a single hand, the operating range of the user's thumb 6 may be limited. In the example shown in FIG. 2A, line 7 represents the maximum reach distance of the user's thumb 6 while holding the terminal device 100 with a single hand. Because the user's range of motion with the thumb 6 is limited up to the maximum reach distance corresponding to line 7, the user is unable to perform a touch operation corresponding to the button 4 in the example of FIG. 2A. Therefore, in order to perform a touch operation by touching the button 4, the user will have to operate the terminal device touch panel display with two hands and/or place the terminal device 100 on a resting surface such as a table such that the button 4 may be touched.

FIG. 2B illustrates a non-limiting example of changing a display area of a displayed interface based on a detected motion, according to certain embodiments. In this example, the terminal device 100 may be placed in motion by the user, for example, by shaking the terminal device 100 and/or causing a physical shock on the terminal device 100 (e.g., by hitting the terminal device 100 on a table or with the opposite hand). In response to the detected motion, the controller 160 may control the display 120 such that the display area of the interface 2 is changed. In the non-limiting example of FIG. 2B, the controller 160 controls the displayed interface such that the entire interface moves downward. As a result of the interface 2 moving downward in response to the detected motion, the button 4 is now within the maximum reach distance corresponding to the line 7. Therefore, the user's thumb 6 may reach the button 4, and a touch operation corresponding to the button 4 may be performed.

Figure 3:
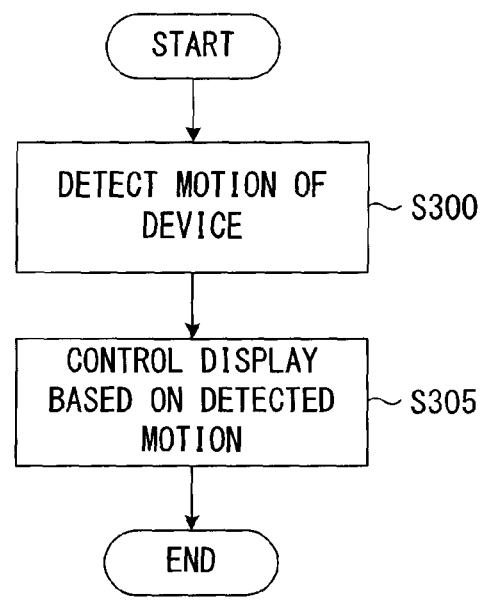
FIG. 3 illustrates a non-limiting exemplary flowchart for controlling a display panel based on a detected motion, according to one embodiment.

Next, FIG. 3 illustrates a non-limiting exemplary flowchart for controlling a display panel based on a detected motion, according to certain embodiments. The exemplary flowchart of FIG. 3 starts at step S300, where a motion of the terminal device 100 is detected by the motion sensor 108. In response to detecting the motion of the terminal device 100, the motion sensor 108 may generate a detection signal corresponding to the motion. In certain embodiments, the detection signal may include data representing features of the detected motion. For example, the detection signal may include a measured acceleration, a velocity, a direction of the motion, a number of physical shocks detected during the motion, a number of movements in the motion, a duration of the motion, a distance traveled by the device during the motion, other operations detected to have occurred at substantially the same time as the detected motion, a detected position of the user's fingers while performing the motion (e.g. the display panel 120 may determine a position of the user's fingers gripping a protective case of the terminal device 100 by measuring electrostatic capacitance values or other similar values for detecting a touch operation on the display panel 120, which can be used to determine a position of the user's fingers when the motion is detected), etc.

At step S305, the controller 160 controls the display 120 such that a display area of a displayed interface is changed. In certain embodiments, the controller 160 may control the display panel 120 such that a single element included in the displayed interface is moved to a different location and/or changes size from its original position/size. In certain embodiments, the controller 160 may control the display 120 such that the entire displayed interface is moved and/or changes size.

In certain embodiments, the entire displayed interface may be moved such that an element included in the displayed interface is within a maximum reach distance of a user's operating finger. Exemplary elements that may be included within a displayed interface include an icon, a window, an image, a text box, and/or a control element for controlling aspects of the terminal device 100.

In certain embodiments, one or more elements included in a displayed interface may be moved and/or change size such that they are within a maximum reach distance of the user's finger. A default value for maximum reach distance may be stored in advance. Alternatively, the user may set a maximum reach distance, e.g., in a device settings interface. The controller 160 may, in certain embodiments, determine a maximum reach distance based on a detected position of the user's fingers prior to the motion. For example, maximum reach distance may be defined relative to a detected position of the user's thumb, and the controller 160 may select a maximum reach distance from the detected thumb position based on an expected or predetermined distance corresponding to the user's thumb length.

In step S305, the controller 160 may determine, in certain embodiments, a direction in which the display element of the interface should be moved, based on features of the detected motion. In certain embodiments, the controller 160 may determine a distance within the interface that the display element included in the interface should move based on the detected motion.

Following the change in display area performed at step S305, the controller 160 may, in certain embodiments, perform a coordinate correction process that updates the display coordinates in the display 120 such that the new display coordinates following the change in display area are associated with the processing of the original coordinates. Therefore, when a touch operation is performed on the display 120 following the change in display area in response to a detected motion, the coordinate correction process ensures that the same action is performed when the touch operation is detected that would otherwise be performed when the element touched during the touch operation is in its original position (i.e., prior to the change in display area). Consequently, a mismatching of operational processing does not arise when touch operations are detected following a change in display area in response to detected motion of the terminal device 100.

Figure 4A:
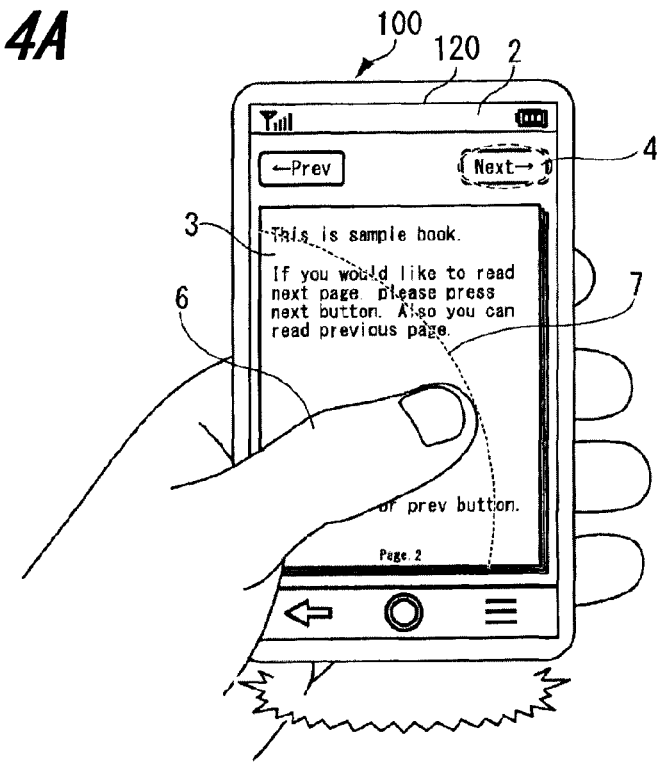
FIGS. 4A and 4B illustrate a non-limiting example of altering a size of a displayed element based on a detected motion, according to one embodiment.
Figure 4B:
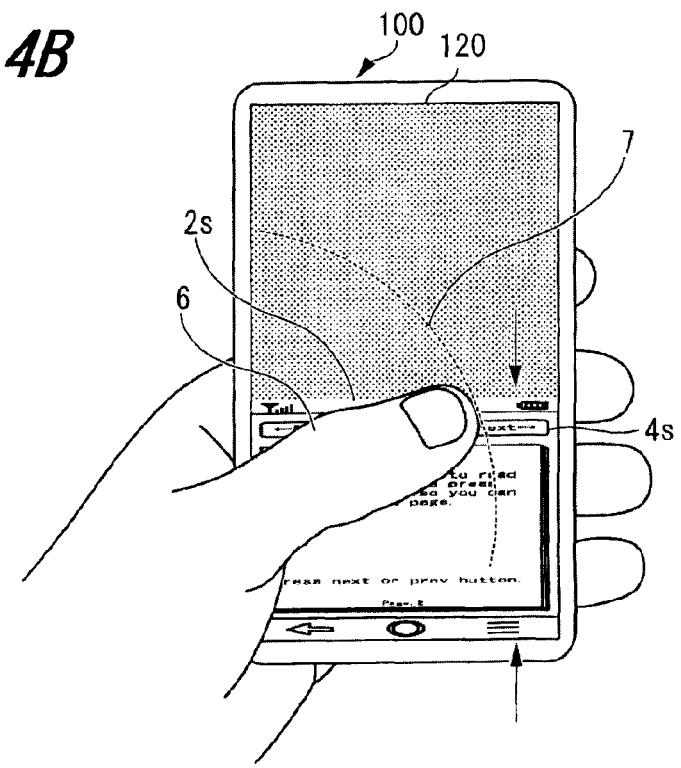

Next, FIGS. 4A and 4B illustrate a non-limiting example of altering a size of a displayed element in an interface based on a detected motion, according to certain embodiments.

Referring first to FIG. 4A, FIG. 4A illustrates an example in which a user is holding the terminal device 100 with his or her left hand. As in the case of FIG. 2A, the user's grip on the terminal device 100 limits the maximum reach distance of the user's thumb 6 to a range corresponding to the line 7. Therefore, because the user's thumb 6 cannot reach the upper right corner of the displayed interface 2, the user cannot perform a touch operation on the button of the interface 2.

FIG. 4B illustrates an example of changing a display size of the interface 2 in response to a detected motion of the terminal device 100. In the example of FIG. 4B, the user may perform a motion on the terminal device 100 such as hitting the terminal device 100 on a table or a part of the human body, or shaking the terminal device. In response to detecting the motion of the terminal device 100, the motion sensor 108 may generate a detection signal including features representing the detected motion. The detection signal may be output to the controller 160 and, based on the detection signal, the controller 160 may control the display 120 such that a display area of the interface 2 is changed. In the non-limiting example of FIG. 4B, the controller 160 controls the display 120 such that the interface 2 shown in FIG. 4A is reduced in size. The reduced interface is illustrated in the non-limiting example of FIG. 4B as interface 2s. As illustrated in the example of FIG. 4B, the reduction in size of the interface results in the displayed position of the button 4 from FIG. 4A displayed in a new position corresponding to button 4s in FIG. 4B. Therefore, by reducing the display size of the interface, the button 4s is within the maximum reach distance of the user's thumb 6, thereby allowing the user to perform a touch operation on the button 4s.

Figure 5:
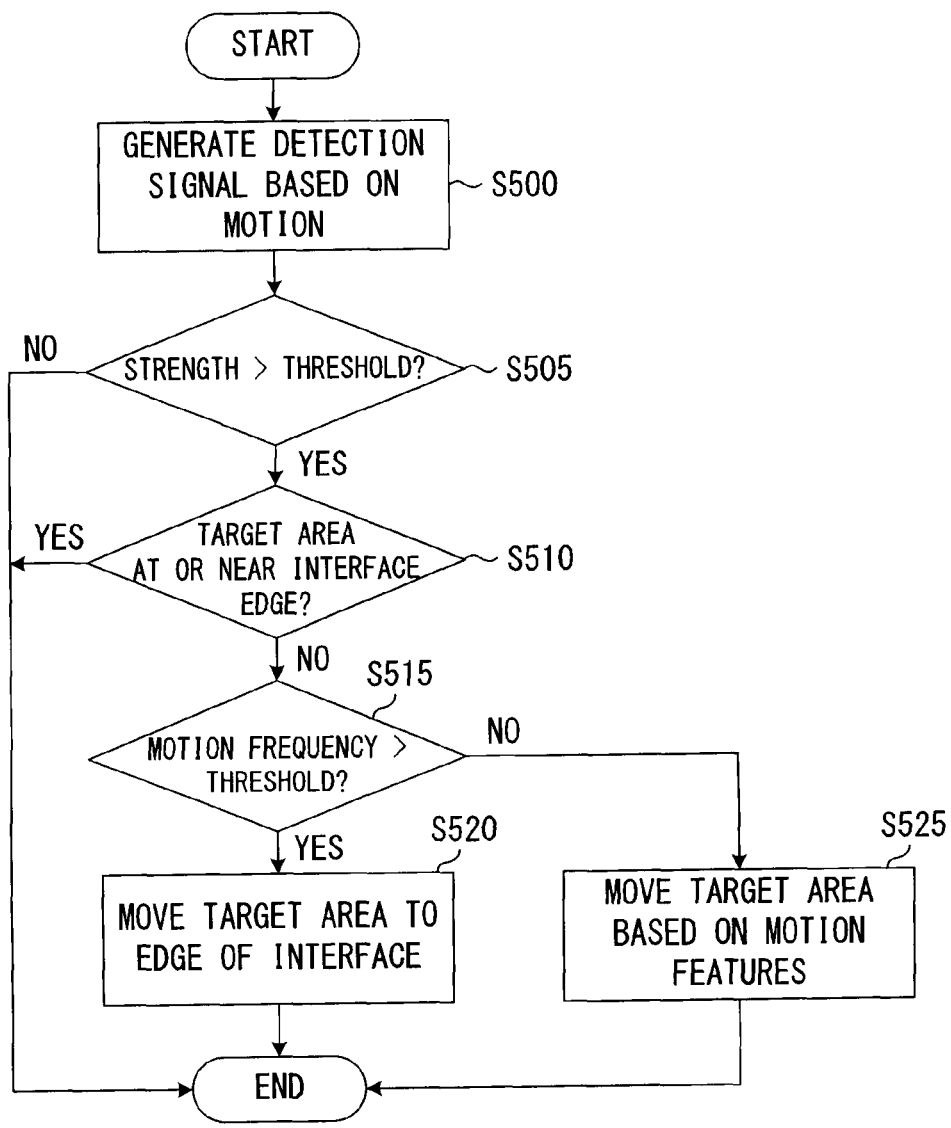
FIG. 5 illustrates a non-limiting exemplary flowchart for controlling a displayed interface based on a detected motion, according to one embodiment.

Next, FIG. 5 illustrates a non-limiting exemplary flowchart for controlling a displayed interface based on a detected motion, according to certain embodiments.

First, the motion sensor 108 detects a motion of the terminal device 100 and generates a detection signal corresponding to the detected motion. As discussed previously, the detection signal may include data representing various features corresponding to the detected motion, such as the motion's acceleration, velocity, direction, frequency of movements within the motion, a number of movements in the motion, a number of physical shocks detected during the motion, etc. The generated detection signal is then output to the controller 160 such that the controller 160 may control the display 120 according to aspects of the present disclosure.

Next, in certain embodiments, the controller 160 at step S505 determines if a magnitude of the detected acceleration included in the detection signal is greater than a predetermined threshold. If the acceleration is less than the predetermined threshold, the processing ends at this point. Otherwise, the controller 160, in certain embodiments, determines at step S510 whether a target area included in the displayed interface is within a predetermined distance from an edge of the display 120. In certain embodiments, rather than determining that the target area is exactly on the edge of the display 120, the controller 160 may determine whether a particular target area included in the interface is within the predetermined distance from the edge of the display 120. In certain embodiments, the controller 160 may determine if the target area is within the predetermined distance from the edge of the display 120 by determining whether any or all of the target area is displayed within a predetermined range of the edge of the display 120.

If the controller 160 determines at step S510 that the target area is within the predetermined distance from the edge of the display 120, the processing ends at this point. Otherwise, the controller 160 determines at step S515 whether a number of movements detected during the motion is greater than a predetermined threshold value. For the purposes of the present disclosure, a "movement" may be defined as a distinct occurrence of moving the terminal device 100 during a period corresponding to the motion duration. For example, if the terminal device 100 is shaken upwards and downwards, each upward movement of the terminal device 100 during the shaking motion corresponds to a single, discrete movement that may be detected and included in the detection signal by the motion sensor 108. Similarly, each downward movement of the terminal device 100 during the shaking motion may also be detected, and a quantity of the movements in both the upward and downward directions may be summed such that a total number of movements detected during the duration of motion is included in the detection signal by the motion sensor 108. Alternatively, the motion frequency determined at step S515 may, in certain embodiments, correspond to a number of physical shocks detected by the motion sensor 108.

The duration of the motion may, in certain aspects of the present disclosure, be defined as the detected beginning of the motion to the detected end of the motion from the perspective of the motion sensor 108. For example, the beginning of the motion may correspond to a time at which the magnitude of motion of the terminal device 100 (e.g., the acceleration) exceeds a predetermined threshold value, and the end of the motion may be correspond to be the time at which the acceleration of the terminal device falls below the predetermined threshold value. The skilled artisan will appreciate that there are other ways of determining the beginning and end of a motion of a terminal device, and the examples provided herein are merely for illustration purposes and should not be construed as limiting.

Referring back to FIG. 5, if the controller 160 determines that the motion frequency (i.e. the number of detected movements) of the motion is greater than the predetermined threshold at step S515, the controller 160 at step S520 controls the display 120 such that the target area is moved to an edge of the displayed interface. In certain embodiments, the target area may be moved to the edge of the displayed interface at step S520 by moving an edge of the target area to a corresponding position of the edge of the displayed interface. In certain embodiments, the controller 160 may control a display 120 such that the target area is moved within a predetermined distance of the edge of the displayed interface. The direction of motion of the target area within the interface may, in certain embodiments, correspond to a direction of the detected motion. In certain embodiments, the direction of motion of the target area may be based on a relative location on the terminal device 100 where a physical shock is detected.

If the controller 160 at step S515 determines that the motion frequency was below the predetermined threshold value, the controller 160 at step S525 moves the target area based on detected features of the motion included in the detection signal. For example, in certain embodiments, the controller 160 may control the display 120 such that a display area of the interface is moved and/or changes size based on the detected acceleration included in the detection signal. In certain embodiments, the controller 160 may control the display 120 such that the display area of the interface is moved and/or changes size based on the detected direction of the motion. In certain embodiments, the distance the display area moves and/or the change in size of the display area may be proportional to features of the detected motion, such as the detected acceleration and/or the detected distance traveled by the terminal device during the motion. In certain embodiments, the change in display position and/or size of the display area may be changed proportionally to the motion frequency detected by the motion sensor 108. For example, the display area may move a greater distance and/or undergo a greater change in size as the number of movements detected in the motion increases.

Figure 6A:
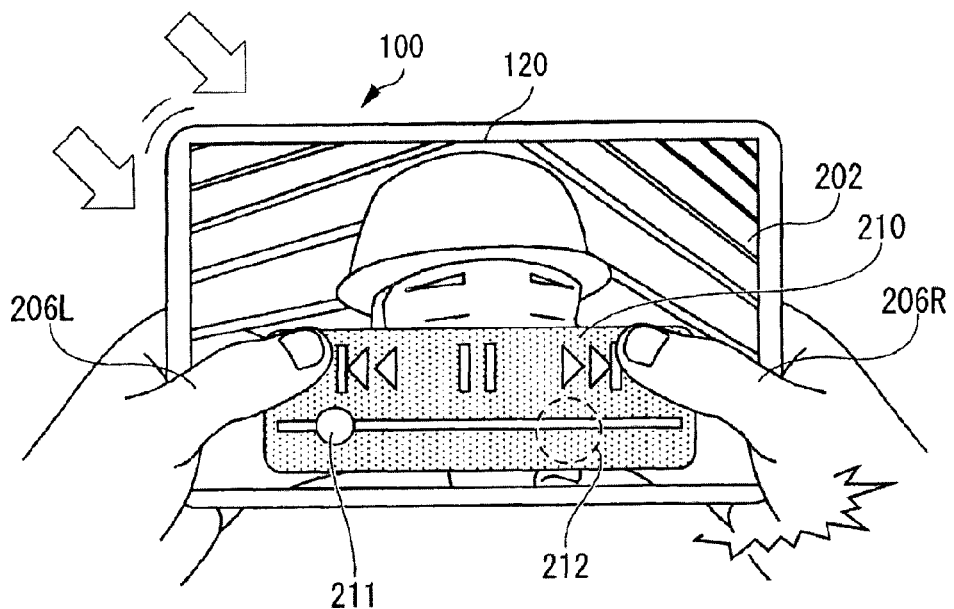
FIGS. 6A and 6B illustrate a non-limiting example of controlling a display position of an interface element based on a detected motion, according to one embodiment.
Figure 6B:
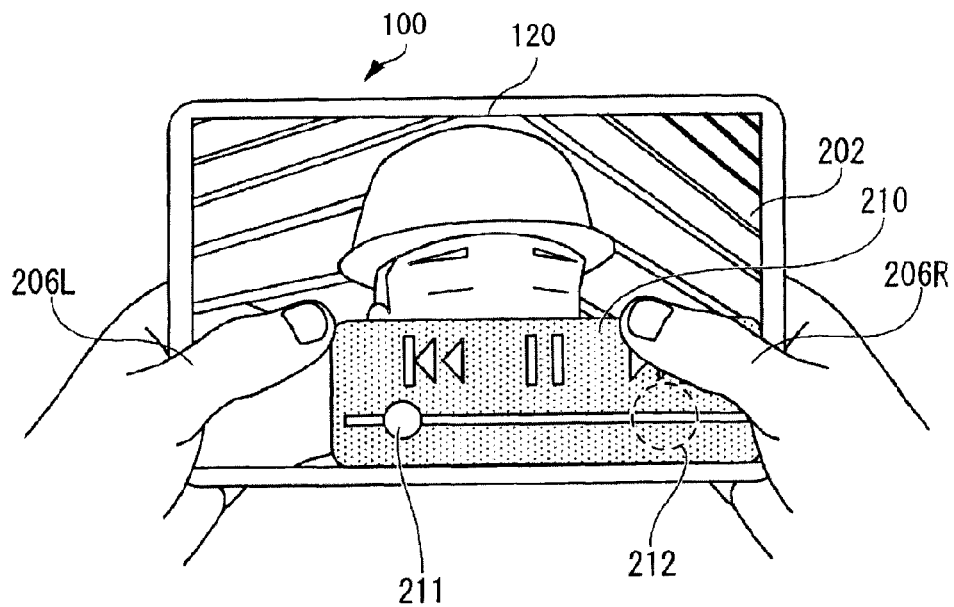

Next, FIGS. 6A and 6B illustrate a non-limiting example of controlling a display position of a display area based on a detected motion, according to certain embodiments.

Referring first to FIG. 6A, the example of FIG. 6A illustrates an interface 202 displayed on the display 120 of terminal device 100. As shown in the figure, the user is holding the terminal device 100 on opposing ends with the user's left and right hands. A target area 210 is included in the interface 202. In certain embodiments, the target area 210 may control aspects of a video displayed on the interface 202. An icon 211 is included in the target area 210, wherein the icon 211 may, for example, be operated via a touch operation to change a video playback position, a volume, etc., of the video output on the interface 202. Due to the size of the display 120, neither the user's left thumb 206L nor the user's right thumb 206R is able to reach a target 212 included in the target area 210. That is, in the case in which the icon 211 controls a playback location of the video displayed in the interface 202, the user is unable to advance the video playback to a position corresponding to the target 212 within the target area 210. In other words, the target 212 is outside the maximum reach distance of either of the user's thumbs and therefore, in order to operate the interface 202 as desired, the user would, for example, place the terminal device 100 down on the table and/or remove one or both of the user's hands from the position shown in FIG. 6A such that the touch operation at a position corresponding to the target 212 may be performed.

Referring now to FIG. 6B, FIG. 6B illustrates a non-limiting example of changing a display area of the interface 202 by moving a display position of an element included in the interface. In this example, in response to a detected motion of the terminal device 100, the controller 160 controls the output of the display 120 such that a display position of the target area 210 is moved to the lower right edge of the interface 202. As a result of the movement of the target area 210, the user's right thumb 206R is now able to reach the position on the display 120 corresponding to the target 212. Therefore, the desired touch operation at the target 212 may be performed without unnecessarily removing the user's hands and/or placing the terminal device 100 down on a resting surface.

Non-limiting examples of detected motions of the terminal device 100 that may result in the change in display area illustrated in FIGS. 6A and 6B may include, for example, hitting the terminal device 100 on a table such that a physical shock is detected by the motion sensor 108, shaking the terminal device 100, etc. It should be appreciated that the movement direction and/or magnitude of the example illustrated in FIGS. 6A and 6B is not limiting. For example, rather than moving the target area 210 diagonally to the lower right corner of the interface 202, the controller 160 may control the output of the display 120 such that the target area 210 moves to another position within the interface 202. Further, the display position to which the target area 210 is moved may be based, in certain embodiments, on the detected position of the user's hands prior to the detection of the motion. For example, touch panel sensors included in the touch panel 130 may detect a position of the user's fingers, for example, on a case that surrounds the display 120, or within a predetermined distance from an operating surface of the display 120. In this case, the controller 160 may control the display 120 output such that the target area 210 moves closer to one of the detected positions of the user's hands such that the intended target (e.g., target 212) is more likely to be within the user's maximum reach distance.

In certain embodiments, it may be decided beforehand that the target area 210 will be moved to a particular display position and/or direction (e.g., to the lower right edge of the interface 202) based on the detection signal generated as a result of a detected motion. However, there may be other methods of changing a display position and/or size of an element in the interface 202 according to detected motion. For example, as shown in FIG. 6A, hitting a lower right edge of the terminal device 100 with a hand or hitting the lower right edge of the terminal device 100 on a table results in a physical shock that may be detected by the motion sensor 108. In a non-limiting example of detecting features of a physical shock with a motion sensor, an accelerometer of the motion sensor 108 may detect a change in magnitude and direction of the acceleration of the terminal device 100 when the physical shock occurs. In the example of hitting the terminal device 100 to cause the physical shock, when hitting lower right edge of the terminal device 100, first, acceleration in the lower right direction occurs and then a relatively large acceleration occurs in the direction of the upper left at the moment of the hitting. So, if the terminal device 100 can detect an acceleration change pattern similar to the above, the controller 160 can determine a genesis position of the physical shock caused by the hitting (i.e., a hitting position) is the lower right edge of the terminal device 100. In response to determining the hitting position, the elements in the interface 202 (e.g., target area 210) may be moved based on the detected hitting position (e.g., to the lower right edge of the interface 202). A skilled artisan will appreciate that other methods of determining a hitting position may be easily applied within the scope of the present disclosure, and the aforementioned method is not limiting.

Figure 7A:
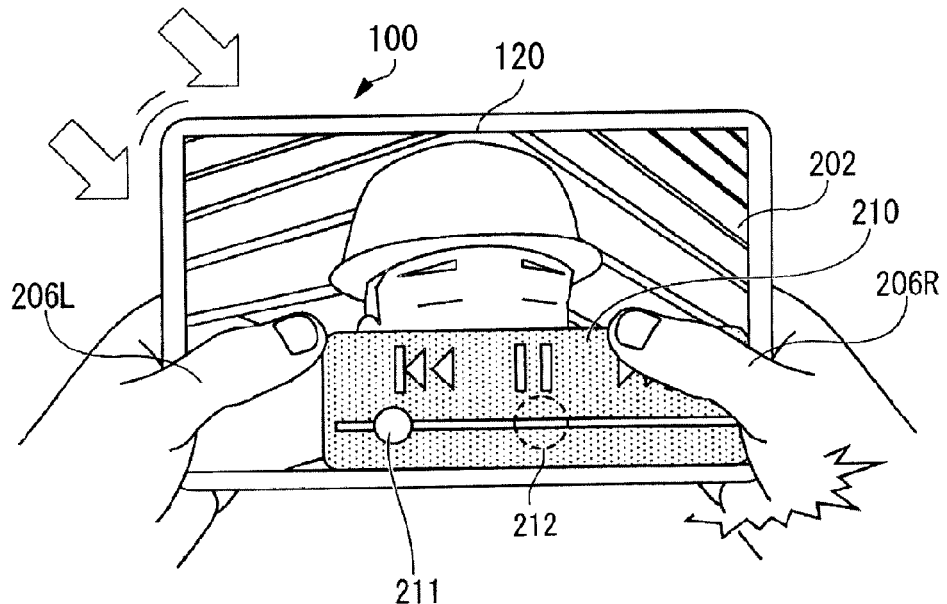
FIGS. 7A and 7B illustrate a non-limiting example of controlling an interface element size based on a detected motion, according to one embodiment.
Figure 7B:
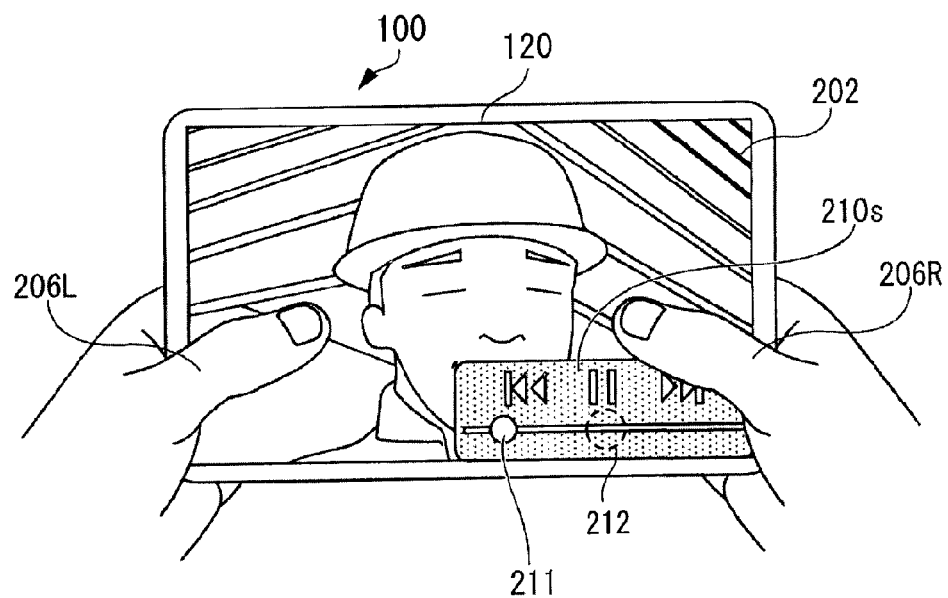

Next, FIGS. 7A and 7B illustrate a non-limiting example of controlling an interface display area size based on a detected motion, according to certain embodiments.

Referring first to FIG. 7A, the example of FIG. 7A illustrates the interface 202 on the terminal device 100 in a similar condition as the condition shown in FIG. 6B. That is, the interface 202 output on the display 120 includes the operating target area 210 in the lower right-hand corner of the interface 202. While the movement of the display position of the target area 210 in previous examples resulted in the user being able to reach certain portions of the target area 210 such that an intended touch operation may be performed (e.g., the target 212 in FIG. 6B was within the user's right thumb 206R maximum reach distance), there may be a case in which the change in display position of the target area 210 is insufficient in bringing a target of the touch operation within a user's maximum reach distance. For example, in the example shown in FIG. 7A, the target 212 is positioned leftward relative to the examples shown in FIGS. 6A and 6B. As a result, the user's right thumb 206R is unable to perform a touch operation corresponding to the position of the target 212. Therefore, in certain embodiments, the user may generate a motion of the terminal device 100 to change a display area of the target area 210 by reducing the element size of the target area 210.

Referring now to FIG. 7B, a detected motion by the motion sensor 108 results in a detection signal generated by the motion sensor 108, and the detection signal is then output to the controller 160. The controller 160 then controls the output of the display 120 such that the target area 210 is reduced in size, resulting in target area 210s shown in FIG. 7B. As a result of the reduction in size of the target area, the user's right thumb 206R is able to reach the display position of the target 212.

It should be noted that the reduction in size of the target area 210 may be performed independently and/or in combination with the change in display position of the target area. In other words, the controller 160 may change a display area included in the interface 202 by changing the displayed size of an element in the display area in addition to, in combination with, or independently from a change in display position of the element. Thus, the reduction in size of the target area 210 in the example shown in FIGS. 7A and 7B does not necessarily need to occur following the change in display position of the target area 210.

As discussed previously, the features discussed above for FIGS. 7A and 7B may be adapted in certain embodiments such that the change in display size of an element in the interface 202 occurs as a result of features of a detected physical shock. For example, the motion sensor 108 may detect the user hitting the lower right corner of the terminal device 100 in FIG. 7A and generate a detection signal that includes information indicating the hitting position. Thus, in response to receiving the detection signal indicating the hitting position, the interface 202 may be reduced in size based on the detected hitting position (e.g., the reduction in size occurs in a direction toward the hitting position).

Figure 8A:
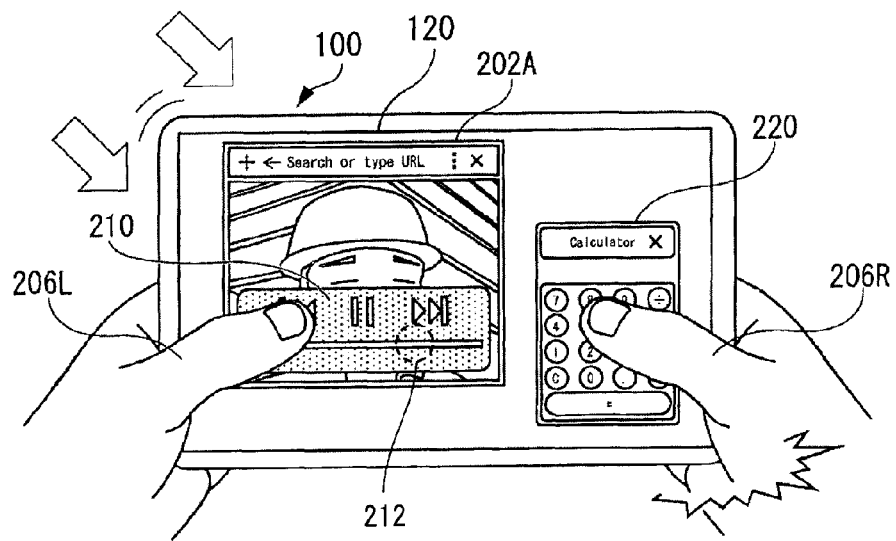
FIGS. 8A and 8B illustrate a non-limiting example of controlling a display position of interface windows based on a detected motion, according to one embodiment.
Figure 8B:
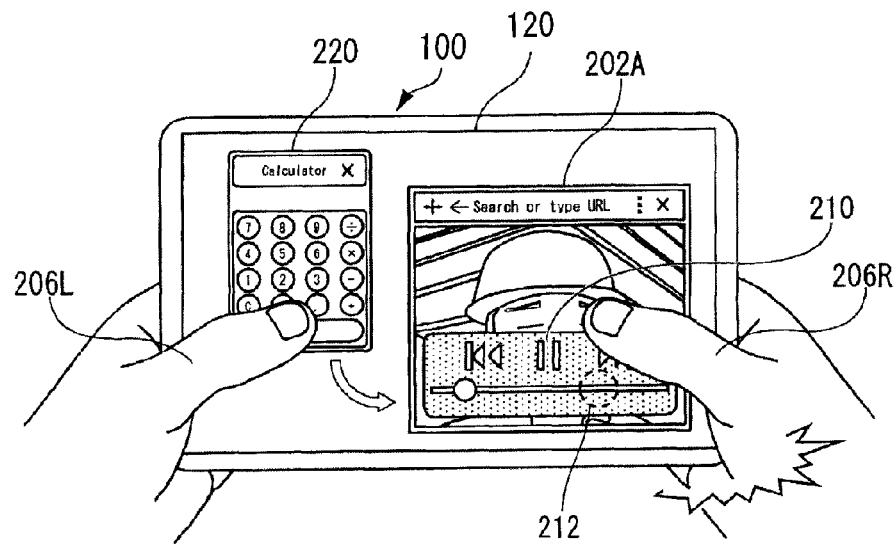

Next, FIGS. 8A and 8B illustrate a non-limiting example controlling a display position of interface windows based on a detected motion, according to certain embodiments.

Referring first to FIG. 8A, FIG. 8A illustrates an example in which a window 202A and a window 220 are included in an interface displayed on the display 120. In the state shown in FIG. 8A, the target 212 within the target area 210 is outside the maximum reach distance of the user's left thumb 206L and the user's right thumb 206R. Accordingly, the controller 160 may control display areas output on the display 120 such that the target 212 is brought within the maximum reach distance of either of the user's thumbs. In certain embodiments, the controller 160 may control display areas of the interface by altering an arrangement of windows included in the interface. For example, the motion sensor 108 may detect a motion of the terminal device 100 shown in FIG. 8A. The detected motion may, for example, correspond to shaking the terminal device 100 or detecting a physical shock imparted on the terminal device 100 by, e.g., hitting the exterior of the terminal device on a table or a part of the human body.

Referring now to FIG. 8B, in response to detecting the motion and receiving a detection signal corresponding to the detected motion, the controller 160 controls the output of the interface displayed on the display 120 such that the displayed position of the windows 202A and 220 is changed. In the example shown in FIG. 8B, the windows 202A and 220 are shown as having their display positions exchanged. However, the change in arrangement of windows included in an interface displayed on the display 120 is not limited to having the window position exchanged, and other display position changes are within the scope of the present disclosure. As a result of the change in display position of the windows 202A and 220 shown in FIG. 8B, the target 212 within the target area 210 is now within the maximum reach distance of the user's right thumb 206R. Thus, the user is able to perform a touch operation corresponding to the target position 212 with the user's right thumb 206R without altering the hand position shown in FIG. 8B.

In certain embodiments, a change in window arrangement may be based on the position on the terminal device 100 onto which a physical shock is imparted. For example, the motion sensor 108, in certain embodiments, may detect that a physical shock is experienced on a right edge of the terminal device 100. In response to detecting the physical shock on the right side of the terminal device 100, the motion sensor 108 outputs to the controller 160 a detection signal including information corresponding to the detected position of the physical shock (i.e., the hitting position). Upon receipt of the detection signal, the controller 160 controls the output of the display 120 such that, for example, the left-most window is rotated to the right. Similarly, the controller 160 may, in certain embodiments, rotate a right-most window to the left in response to detecting a physical shock on the left edge of the terminal device 100. The present disclosure may be adapted such that similar features of altering an arrangement of windows are performed based on a detection of the physical shock in one of the corners of the terminal device 100. For example, in response to detecting a physical shock on the lower right corner of the terminal device 100, the controller 160 may control the display 120 output such that a window in the upper left corner of the interface on the display 120 is rotated to a new arrangement position at the lower right corner of the interface on the display 120.

Figure 9:
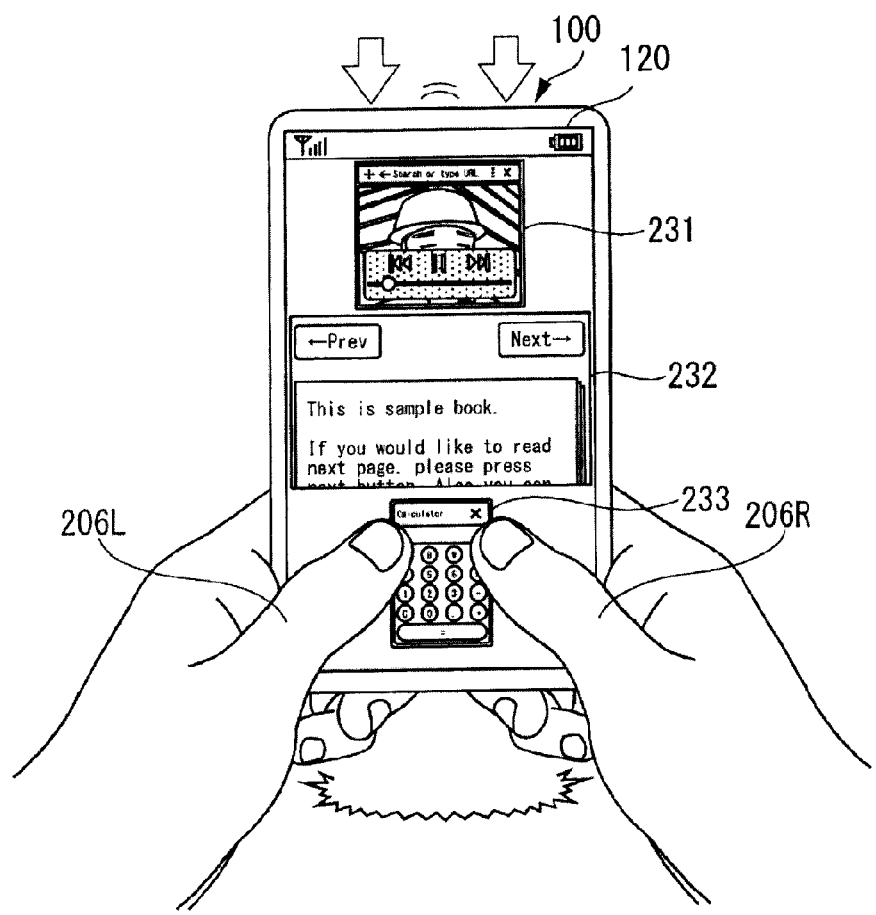
FIGS. 9-11 illustrate non-limiting examples of controlling an arrangement of interface windows based on a detected motion, according to one embodiment.

Next, FIG. 9 illustrates another non-limiting example of controlling an interface window arrangement based on a detected motion, according to certain embodiments. In the example of FIG. 9, the user is holding the terminal device 100 along the longer edges such that an area corresponding to a substantially lower portion of the display 120 may be operated with the user's left thumb 206L and right thumb 206R. Windows 231, 232, and 233 are illustrated in this example as being included in an interface on the display 120. Based on the position of the user's hands in this example, the touch operation is substantially limited to the display area corresponding to the window 233. That is, due to the limited range in reach distance of the user's thumb while holding the terminal device 100 as shown in FIG. 9, a touch operation within the window 231 may not be performed without changing the hand position and/or placing the terminal device 100 on a resting surface such that a free hand may be used. In certain embodiments, an arrangement of the windows 231, 232, and 233 may be changed based on a detected motion of the terminal device 100. For example, the user may impart a physical shock on the terminal device 100 at a lower edge of the terminal device 100. In response to detecting the physical shock, the motion sensor 108 generates a detection signal and outputs the detection signal to the controller 160, which then controls the display 120 to change the arrangement of display positions of the three windows based on the hitting position included in the detection signal.

Figure 10:
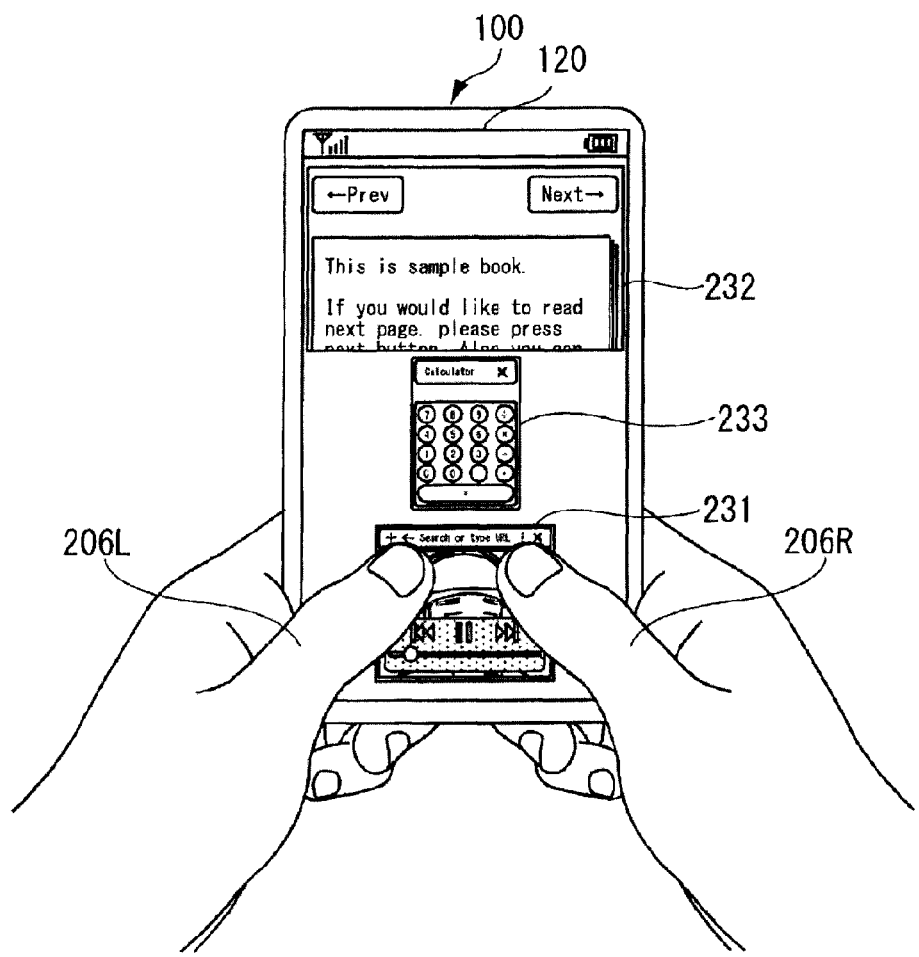

FIG. 10 illustrates an example of an altered arrangement of window positions relative to the example shown in FIG. 9. According to the example of FIG. 10, the detection of the physical shock on the lower edge of the terminal device 100 results in the controller 160 controlling the display such that the uppermost window 231 from FIG. 9 is now the lowermost window in FIG. 10. Additionally, the lowermost window from FIG. 9 (i.e., window 233) is now in the middle position of the three windows in FIG. 10, and the middle window 232 from FIG. 9 is now in the uppermost position in FIG. 10. In other words, each of the three windows shown in FIG. 9 rotated upwards one position, and the window 231, which was the uppermost window, rotated back to the bottom due to the rotation in displayed arrangement. As a result of the change in display arrangement of the windows in FIG. 10, the user may now perform a touch operation within the window 231 by using either the left thumb 206L or the right thumb 206R.

Figure 11:
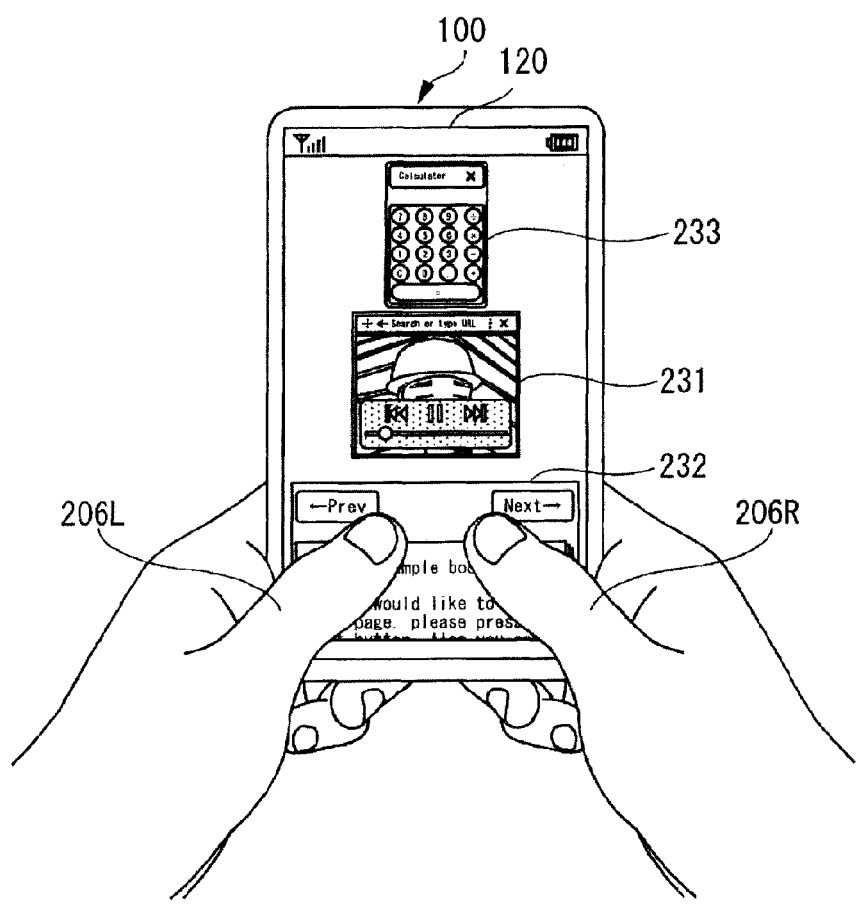

Next, FIG. 11 illustrates another non-limiting example of altering an arrangement position of windows included in an interface based on a detected motion. Referring to the example in FIG. 11, the three windows illustrated in the previous examples of FIGS. 9 and 10 are shown displayed on the interface output on the display 120. In this example, the window arrangement illustrated in FIG. 10 may be altered by striking an upper edge of the terminal device 100 on a table or striking a lower edge of the terminal device 100 on the user's body, such that the motion sensor 108 detects the physical shock and the location on the terminal device 100 at which the physical shock is detected (i.e., the hitting position). In response to the detection, the motion sensor 108 generates a detection signal and outputs the detection signal to the controller 160. In response to receiving the detection signal, the controller 160 controls the interface output on the display 120 such that the window 232, which was in the upper position in FIG. 10, rotates to the lower position in the interface shown in FIG. 11. Similarly, the other windows displayed in the interface from FIG. 10 rotate up one position to result in the new window arrangement illustrated in FIG. 11.

The skilled artisan will appreciate that the example discussed above with respect to FIGS. 9-11 may be performed sequentially such that the arrangement position of the displayed windows continues to change. For example, a detection of a second physical shock on the bottom edge of the terminal device 100 may rotate the middle window 233 shown in FIG. 10 to the lower position such that a touch operation may be performed with the user's left and right thumbs within the window 233. Further, it should be appreciated that aspects of the present disclosure may be adapted such that the change in window arrangement may be altered based on aspects of motion other than the detection of the physical shock and/or the location at which the physical shock is detected. For example, an arrangement of windows included in an interface on the display 120 may be altered based on a detected shaking of the terminal device 100. As a further example, the direction and/or acceleration of the terminal device during the motion may determine the change in arrangement of the windows in the interface. However, it should be appreciated that these motion features are not limiting, and the present disclosure may be adapted such that the arrangement of windows in an interface is changed based on any of the motion features described herein.

Figure 12:
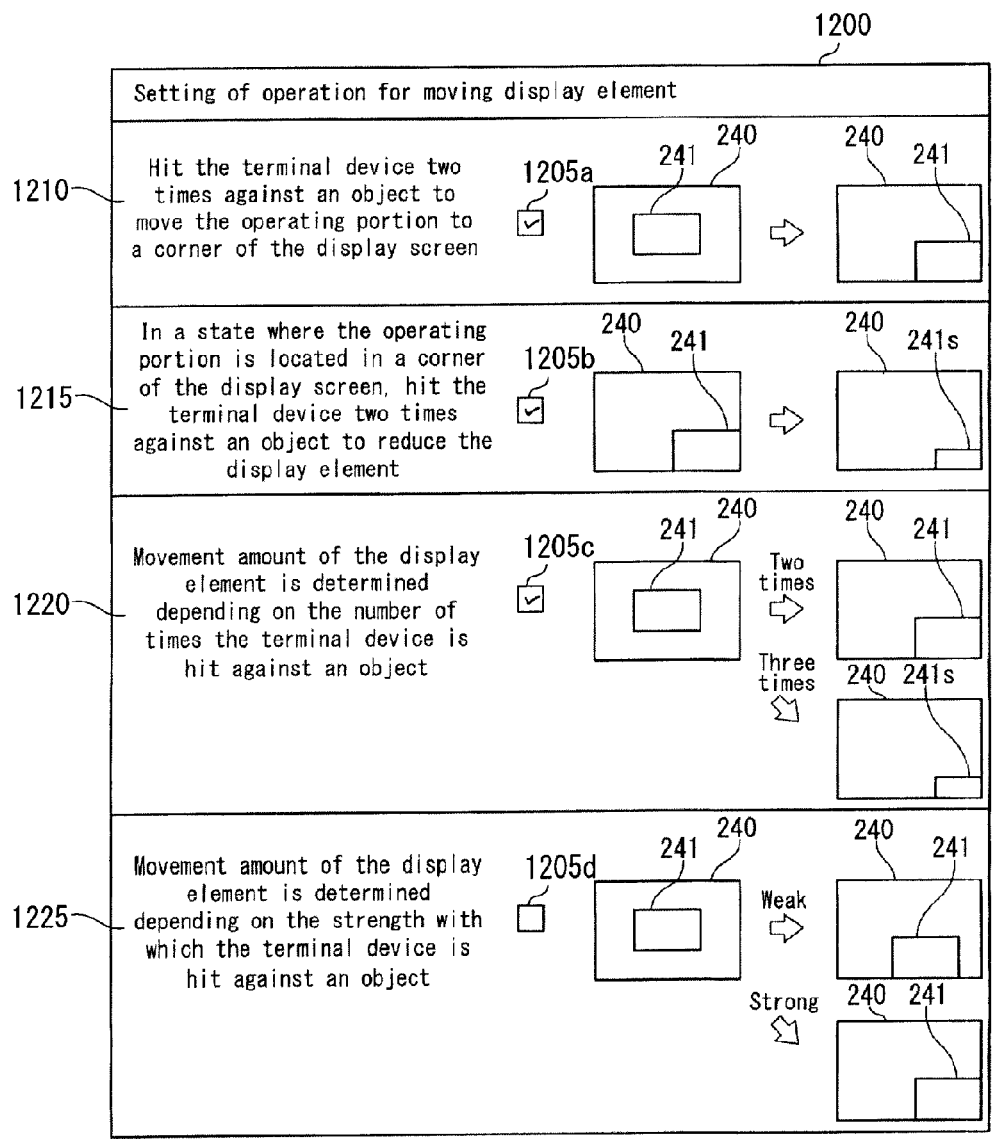
FIG. 12 illustrates a non-limiting example of an interface for setting features of motion-based interface control, according to one embodiment.

Next, FIG. 12 illustrates a non-limiting example of an interface for setting features of motion-based display control, according to certain embodiments. Interface 1200 illustrated in FIG. 12 includes areas 1210, 1215, 1220, and 1225, which may be configured to provide user control of settings associated with controlling a display area of an interface based on a detected motion of the terminal device 100. It should be appreciated that the operation settings illustrated in FIG. 12 are provided merely for exemplary purposes and should not be construed as limiting. The skilled artisan will appreciate that the interface illustrated in the example of FIG. 12 may be altered such that other features of display control may be included in the interface 1200.

Referring to area 1210, area 1210 provides control settings corresponding to a change in display position of an interface element based on a detected physical shock on the terminal device 100. In this example, by checking a box 1205a included in the interface area 1210, the controller 160 may perform display control processing such that an element included in an interface is moved to a corner of the display screen in response to detecting two physical shocks on the terminal device. The number of physical shocks that result in the display control according to area 1210 is arbitrary, and values other than two may be applied. The area 1210 includes an illustrative example of a display 240 and a target area 241, which illustrate the operation performed by the controller 160 in response to the user checking the box 1205a.

Next, area 1215 of the interface 1200 is provided to control a display area size in response to a detected motion of the terminal device. In this example, by checking box 1205b illustrated in the area 1215, the controller 160 may reduce a size of a display area in an interface when the motion sensor 108 detects that the terminal device 100 is hit twice while the display area is currently in the corner of the interface. The target area 241 is illustrated in the lower right corner of the display 240 in the illustrative portion of area 1215, and a reduced element 241s is illustrated in the lower right corner of the display 240, which illustrates the reduction in size features performed by selecting this option.

Next, area 1220 provides user control of display features based on a number of times the terminal device is hit against an object. In this example, when the user selects box 1205c in the area 1220, the controller 160 controls the display interface such that a display area in the interface is moved to a corner of the interface when the device is detected to be hit against an object two times. Further, the controller 160 controls the interface such that the element is reduced in size in the corner of the interface when the terminal device is detected to be hit three times against an object. The illustrated portion on the right side of the area 1220 illustrates the display processing by selecting this interface option.

Next, area 1225 provides display control according to a detected strength of motion of the terminal device. In this example, by selecting the box 1205*d*, the controller 160 controls the display 120 such that a display area included in an interface is moved and/or reduced in size based on a detected strength of motion. In certain embodiments, the strength of the motion corresponds to the detected acceleration of the motion. In an example of area 1225, target area 241 in the display 240 is shown moving down and slightly to the right in response to a weak motion of the terminal device, and the target area 241 is moved to the lower right corner of the display 240 in response to detecting a strong motion of the terminal device. The skilled artisan will appreciate that threshold values may be selected for comparison when performing display control and moving elements within the interface based on motion. For example, when the detected motion is above a predetermined acceleration value, the controller 160 may control the display 120 such that an element in the display is moved to an edge of the display interface. Similarly, when the acceleration is below the predetermined threshold value, the controller 160 may control the display 120 such that the element is moved a predetermined distance from its original position. In certain embodiments, the controller 160 may control the display such that the distance the element in the display interface is moved is based directly upon the detected strength of the motion. For example, the distance of movement within the displayed interface may be directly proportional to the detected acceleration of the motion.

In certain embodiments, the controller 160 may control the availability of areas in the interface 1200 in response to selecting control features illustrated in this example. For example, when the box 1205*c* is selected in the area 1220, the controller 160 may disable areas 1210 and 1215 in the interface 1200, thereby precluding the user from selecting these control features. As an example of disabling areas within the interface 1200, the areas 1210 and 1215 may be grayed out in response to the user selecting the box 1205*a* in the area 1200.

Figure 13:
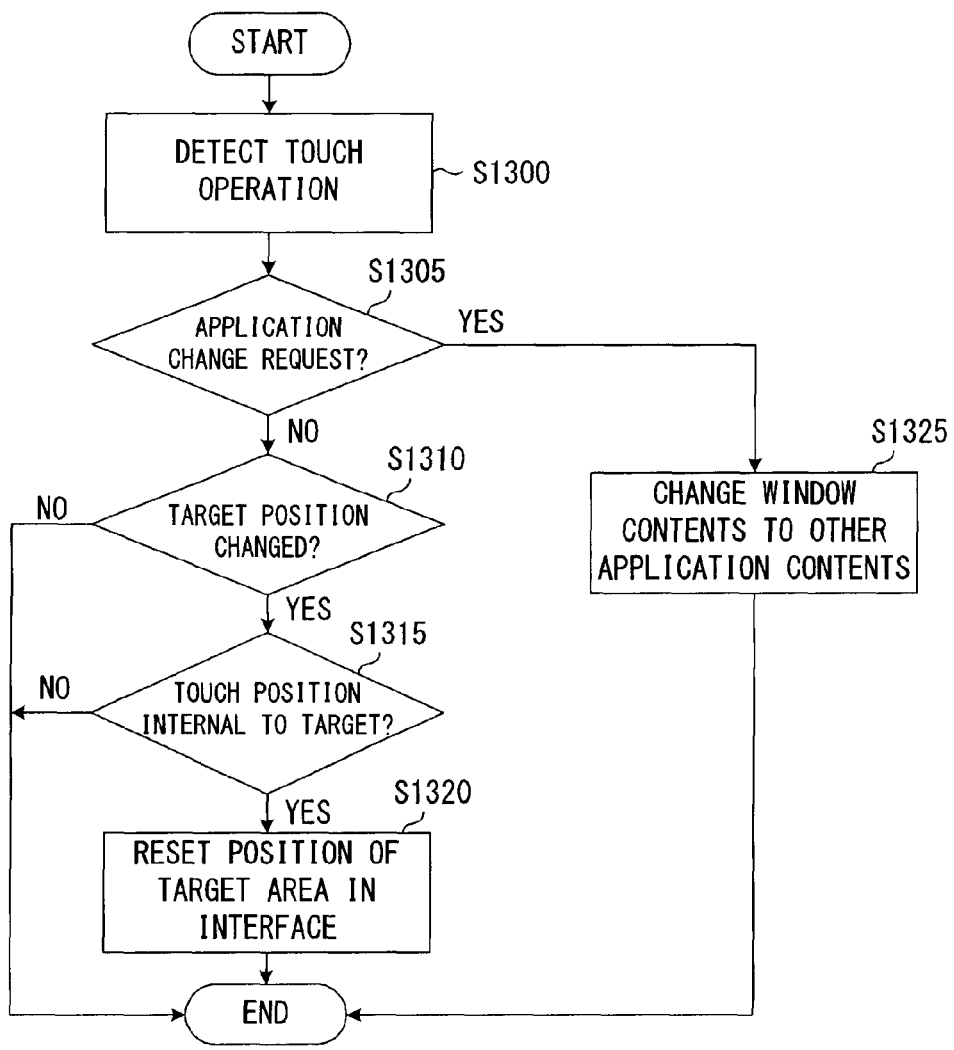
FIG. 13 illustrates a non-limiting exemplary flowchart for restoring an interface to an original condition, according to one embodiment.

Next, FIG. 13 illustrates a non-limiting example of restoring an interface to an original condition, according to certain embodiments. For the purposes of this example, "original condition" corresponds to the original size and display positions of the elements included in the interface prior to the change in position and/or size caused by the detected motion of the terminal device.

Referring now to the example in FIG. 13, the controller 160 at step 1300 determines whether a touch operation is performed on an operating surface of the display 120. For example, one more touch sensors included in the touch panel 130 may detect that a touch operation is performed when a user's finger contacts the operational surface of the display 120.

At step S1305, the controller 160 determines whether the detected touch operation corresponds to an application change request. If yes, the controller 160 at step S1325 controls the display 120 such that the displayed interface changes the window contents to other application content. Otherwise, the controller 160 at step S1310 determines whether the position in the display screen of the display element has changed. That is, the controller 160 at step S1310 determines whether an element included in the interface has changed size and/or display position as a result of motion-based display control processing according to aspects of the present disclosure. If the controller 160 determines at step S1310 that the target element position has not changed, the processing ends at this point.

Otherwise, the controller 160 at step S1315 determines whether the position of the touch operation was internal to the target element. If not, the processing ends at this point. Otherwise, the controller 160 at step S1320 controls the interface such that the position of the target element is reset to its original condition within the interface in response to the detected touch operation.

Figure 14:
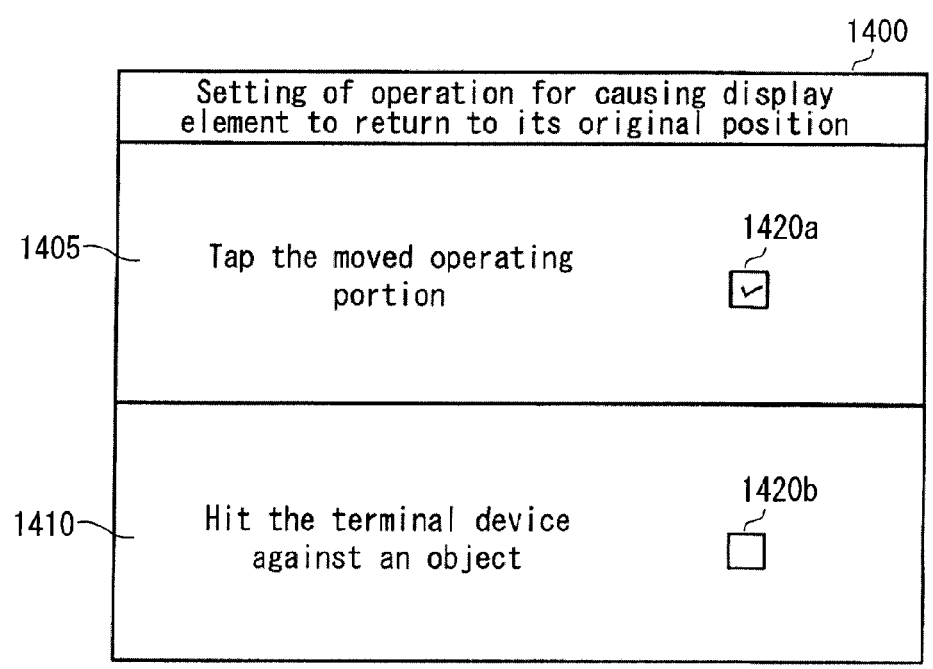
FIG. 14 illustrates a non-limiting example of an interface for setting interface restoration controls, according to one embodiment.

Next, FIG. 14 illustrates a non-limiting example of an interface for setting interface restoration controls, according to certain embodiments. FIG. 14 includes an interface 1400, which includes an area 1405 and an area 1410. The areas 1405 and 1410 respectively include a box 1420*a* and 1420*b* for selecting display control operation settings. Referring to the area 1405, the user may select the box 1420*a* such that the controller 160 performs an operation of restoring an element in an interface to its original condition in response to a detected tap operation (i.e., a touch operation whereby the user taps the operation surface of the touch panel). Referring to area 1410, the user may select the box 1420*b* such that the controller 160 restores the interface elements to their original condition in response to detecting the terminal device being hit against another object. As in previous examples, in certain embodiments, area 1405 or area 1410 may be disabled in response to the user selecting one of the boxes 1420*a* or 1420*b* in either area. For example, the box 1420*b* in area 1410 may be disabled in response to the selecting the box 1420*a* in the area 1405.

Obviously, numerous modifications and variations of the present disclosure are possible in light of the above teachings. It is therefore to be understood that within the scope of the appended claims, the features described herein may be practiced otherwise than as specifically described herein. For example, advantageous results may be achieved if the steps of the disclosed techniques were performed in a different sequence, if components in the disclosed systems were combined in a different manner, or if the components were replaced or supplemented by other components.

Further, as a parameter for detecting motion causing the controller 160 to change an interface display area, the present disclosure is not limited to the frequency of movements in a motion, the size of an acceleration, and the direction of a motion of a terminal device, or other features described herein. For example, the interval at which a motion is repeated and the size of the motion may be applicable to the display control processing described herein. Moreover, a combination of motion features may be used.

The direction of action of the user with respect to a terminal device is not restricted upward and/or downward movements, but rather the present disclosure may be adapted such that display control is performed based on a detected motion in an arbitrary direction. Further, the motion sensor 108 may detect a motion of the terminal device in an arbitrary direction. Further, the direction a display element is moved in response to a detected motion is not limited to the direction of down and/or in a lower right direction, but rather the controller 160 may perform display control such that display elements are moved in any direction. The arbitrary direction of movement may, in certain embodiments, correspond to a detected position of the user's fingers on, around, and/or near the terminal device touch panel.

Additionally, a change in display area corresponding to a change in size of a display element is not limited to a reduction in size of the display element. Rather, the display element may also be enlarged.

Further, for example, in S515 of FIG. 5, although the controller 160 determined the number of detected movements in the motion of the terminal device 100, the controller 160 may also be configured to move a display element according to, e.g., the magnitude of an acceleration, the direction of a motion, and/or the size/total elapsed distance of a motion.

The direction of a motion of a display element is not restricted to the corresponding direction of motion of the terminal device. The controller 160 may also move a display element a different direction than the direction of detected motion.

Although certain examples illustrated striking the terminal device 100 as an action for performing display control processing, the display control processing described herein may also be performed in response to the detection of other motion and/or physical shocks, or a combination thereof. For example, rather than detecting a physical shock, the controller 160 may alter a display area in an interface based on a detected shaking of the terminal device 100.

Further, the average acceleration magnitude when a terminal device moves multiple times may be applicable as the degree of the acceleration at the time of the terminal device moving.

When tapping a display element following a change in display position/size of the display element, as in FIG. 13, the display element shown in the example returns to an original position. However, rather than returning to the original condition when the user touches inside the element, the display element may return to its original condition in response to detecting a touch operation in an arbitrary position on the display panel. Alternatively, the display element may return to its original condition after a predetermined time elapses since the change in display area. Alternatively, in certain embodiments, a "home" button, or the like, that returns the interface to a home screen may be included, e.g., in the operation key 140, wherein pressing the home button returns elements in the interface to their original condition.

Further, while the examples described herein illustrated touch operations performed with the user's thumb(s), the features described herein may be applied to touch operations using any finger or suitable instruction object (e.g., stylus, etc.).

Moreover, the terminal device of this disclosure is not limited to a smart phone, but rather the features described herein are applicable to any device provided with touch panels, such as a digital book reader, a game terminal, a mobile telephone terminal, or the like.

The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: a display panel configured to display an interface; a motion sensor configured to detect a motion of the device and to output a detection signal in response to the detection of the motion; and circuitry configured to control, based on the detection signal, the display panel such that at least one of a display position and a display size of an element displayed in the interface changes, wherein when the motion includes a physical shock on the device, the detection signal includes an indication of a hitting position corresponding to a position on the device where the physical shock is detected by the motion sensor, and the circuitry controls the display panel such that the at least one of the display position and the display size of the element changes based on the hitting position.

(2) The device according to (1), further comprising a memory that stores a maximum reach distance corresponding to a furthest point on the display panel reachable by a user's hand when the hand is holding the device, wherein the circuitry is configured to control the display panel such that the element changes the at least one of the display position and the display size such that at least a portion of the element is displayed within the maximum reach distance.

(3) The device according to (1) or (2), wherein: the display panel includes a touch sensor configured to detect an initial position of one or more fingers of a user's hand prior to the detected motion, and the at least one of the display position and the display size of the element is changed based on the initial position of the one or more fingers.

(4) The device according to any one of (1) to (3), wherein the circuitry is configured to control the display panel by moving the element to within a predetermined distance from an edge of the display panel.

(5) The device according to any one of (1) to (4), further comprising a memory that stores a maximum reach distance corresponding to a furthest point on the display panel reachable by a user's hand when the hand is holding the device, wherein the predetermined distance corresponds to the maximum reach distance.

(6) The device according to any one of (1) to (5), wherein: the motion sensor is configured to detect a number of movements in the motion and to include the number of movements in the detection signal; and the circuitry is configured to control the display panel such that the at least one of the display position and the display size changes based on the number of movements detected in the motion.

(7) The device according to any one of (1) to (6), wherein the at least one of the display position and the display size of the element is changed by a magnitude that is based on the number of detected movements.

(8) The device according to any one of (1) to (7), wherein: the motion sensor is configured to detect a direction of the motion and to include the direction of the motion in the detection signal; and the circuitry is configured to change the at least one of the display position and the display size of the element in a direction corresponding to the detected direction of the motion.

(9) The device according to any one of (1) to (8), wherein: the motion sensor is configured to determine a number of physical shocks detected during the motion and to include the number of physical shocks in the detection signal; and the circuitry is configured to control the display panel such that the at least one of the display position and the display size changes based on the number of physical shocks detected by the motion sensor.

(10) The device according to any one of (1) to (9), wherein: the motion sensor is configured to measure an acceleration of the device during the motion and to include the measured acceleration in the detection signal; and the circuitry is configured to change the at least one of the display position and the display size based on the measured acceleration.

(11) The device according to any one of (1) to (10), wherein the circuitry is configured change the at least one of the display position and the display size of the element when the measured acceleration exceeds a predetermined threshold.

(12) The device according to any one of (1) to (11), wherein the display size of the element is reduced based on the detection signal.

(13) The device according to any one of (1) to (12), wherein the circuitry is configured to further change the at least one of the display position and the display size when the motion sensor detects a second motion following the change in the at least one of the display position and the display size resultant from a preceding motion.

(14) The device according to any one of (1) to (13), wherein: the circuitry is configured to restore the at least one of the display position and the display size to their original condition in response to the second motion; and the original condition corresponds to a display position and a display size of the element prior to the preceding motion.

(15) The device according to any one of (1) to (14), further comprising a touch sensor configured to detect a touch operation performed on a surface of the display panel, wherein the circuitry is configured to restore the element to its original condition when the touch operation is detected subsequent to the change in the at least one of the display position and the display size, and the original condition corresponds to a display position and a display size of the element prior to the change in the at least one of the display position and the display size caused by the motion.

(16) The device according to any one of (1) to (15), wherein: the element is a window, of a plurality of windows displayed in the interface; and the circuitry is configured to alter, based on the detection signal, an arrangement of the window with respect to the plurality of windows.

(17) The device according to any one of (1) to (16), wherein the arrangement is altered by exchanging the display position of the window with a display position of another window, of the plurality of windows.

(18) The device according to any one of (1) to (17), wherein the circuitry is configured to alter, when the motion includes the physical shock on the device, the arrangement of the window based on the hitting position.

(19) A method of controlling a display panel configured to display an interface, the method comprising: detecting, by a motion sensor, a motion of the display panel; generating, by circuitry, a detection signal in response to the detection of the motion; and controlling, by the circuitry, based on the detection signal, the display panel such that at least one of a display position and a display size of an element displayed in the interface changes, wherein when the motion includes a physical shock on the display panel, the detection signal includes an indication of a hitting position corresponding to a position on the display panel where the physical shock is detected by the motion sensor, and the circuitry controls the display panel such that the at least one of the display position and the display size of the element changes based on the hitting position.

(20) A non-transitory computer readable medium having instructions stored therein that when executed by one or more processors cause a device including a motion sensor and a display panel configured to display an interface to perform a method comprising: detecting, by the motion sensor, a motion of the display panel; generating a detection signal in response to the detection of the motion; and controlling based on the detection signal, the display panel such that at least one of a display position and a display size of an element displayed in the interface changes, wherein when the motion includes a physical shock on the display panel, the detection signal includes an indication of a hitting position corresponding to a position on the display panel where the physical shock is detected by the motion sensor, and the display panel is controlled such that the at least one of the display position and the display size of the element changes based on the hitting position.

The invention claimed is:

1. A device comprising:
a motion sensor configured to detect a motion of the device and to output a detection signal in response to the detection of the motion; and
circuitry configured to control, based on the detection signal, a display panel such that at least one of a display position and a display size of an element displayed in an interface displayed by the display panel changes, wherein
when the motion includes a physical shock on the device, the detection signal includes an indication of a hitting position corresponding to a position on the device where the physical shock is detected by the motion sensor, and the circuitry controls the display panel such that the at least one of the display position and the display size of the element changes in a direction determined based on the hitting position.

2. The device according to claim 1, further comprising
a memory that stores a maximum reach distance corresponding to a furthest point on the display panel reachable by a user's hand when the hand is holding the device, wherein
the circuitry is configured to control the display panel such that the element changes the at least one of the display position and the display size such that at least a portion of the element is displayed within the maximum reach distance from the hitting position.

3. The device according to claim 1, wherein:
the display panel includes a touch sensor configured to detect an initial position of one or more fingers of a user's hand prior to the detected motion, and
the at least one of the display position and the display size of the element is changed based on the initial position of the one or more fingers.

4. The device according to claim 1, wherein
the circuitry is configured to control the display panel by moving the element to within a predetermined distance from an edge of the display panel.

5. The device according to claim 4, further comprising
a memory that stores a maximum reach distance corresponding to a furthest point on the display panel reachable by a user's hand when the hand is holding the device, wherein
the predetermined distance corresponds to the maximum reach distance.

6. The device according to claim 1, wherein:
the motion sensor is configured to detect a number of movements in the motion and to include the number of movements in the detection signal; and
the circuitry is configured to control the display panel such that the at least one of the display position and the display size changes based on the number of movements detected in the motion.

7. The device according to claim 6, wherein
the at least one of the display position and the display size of the element is changed by a magnitude that is based on the number of detected movements.

8. The device according to claim 1, wherein:
the motion sensor is configured to detect a direction of the motion and to include the direction of the motion in the detection signal; and
the circuitry is configured to change the at least one of the display position and the display size of the element in a direction corresponding to the detected direction of the motion.

9. The device according to claim 1, wherein:
the motion sensor is configured to determine a number of physical shocks detected during the motion and to include the number of physical shocks in the detection signal; and
the circuitry is configured to control the display panel such that the at least one of the display position and the display size changes based on the number of physical shocks detected by the motion sensor.

10. The device according to claim 1, wherein:
the motion sensor is configured to measure an acceleration of the device during the motion and to include the measured acceleration in the detection signal; and
the circuitry is configured to change the at least one of the display position and the display size based on the measured acceleration.

11. The device according to claim 10, wherein
the circuitry is configured to change the at least one of the display position and the display size of the element when the measured acceleration exceeds a predetermined threshold.

12. The device according to claim 1, wherein
the display size of the element is reduced based on the detection signal.

13. The device according to claim 1, wherein
the circuitry is configured to further change the at least one of the display position and the display size when the motion sensor detects a second motion following the change in the at least one of the display position and the display size resultant from a preceding motion.

14. The device according to claim 13, wherein:
the circuitry is configured to restore the at least one of the display position and the display size to their original condition in response to the second motion; and
the original condition corresponds to a display position and a display size of the element prior to the preceding motion.

15. The device according to claim 1, further comprising
a touch sensor configured to detect a touch operation performed on a surface of the display panel, wherein
the circuitry is configured to restore the element to its original condition when the touch operation is detected subsequent to the change in the at least one of the display position and the display size, and
the original condition corresponds to a display position and a display size of the element prior to the change in the at least one of the display position and the display size caused by the motion.

16. The device according to claim 1, wherein:
the element is a window, of a plurality of windows displayed in the interface; and
the circuitry is configured to alter, based on the detection signal, an arrangement of the window with respect to the plurality of windows.

17. The device according to claim 16, wherein
the arrangement is altered by exchanging the display position of the window with a display position of another window, of the plurality of windows.

18. The device according to claim 16, wherein
the circuitry is configured to alter, when the motion includes the physical shock on the device, the arrangement of the window based on the hitting position.

19. A method of controlling a display panel configured to display an interface, the method comprising:
detecting, by a motion sensor of a device, a motion of the device;
generating, by the motion sensor, a detection signal in response to the detection of the motion; and
controlling, by circuitry of the device, based on the detection signal, the display panel such that at least one of a display position and a display size of an element displayed in the interface changes, wherein
when the motion includes a physical shock on the device, the detection signal includes an indication of a hitting position corresponding to a position on the device where the physical shock is detected by the motion sensor, and
the circuitry controls the display panel such that the at least one of the display position and the display size of the element changes in a direction determined based on the hitting position.

20. A non-transitory computer readable medium having instructions stored therein that when executed by one or more processors cause a device including a motion sensor to perform a method comprising:
detecting, by the motion sensor, a motion of the device;
generating a detection signal in response to the detection of the motion; and
controlling based on the detection signal, a display panel such that at least one of a display position and a display size of an element displayed in an interface displayed by the display panel changes, wherein
when the motion includes a physical shock on the device, the detection signal includes an indication of a hitting position corresponding to a position on the device where the physical shock is detected by the motion sensor, and
the display panel is controlled such that the at least one of the display position and the display size of the element changes in a direction determined based on the hitting position.

* * * * *